United States Patent [19]
Cross

[11] 3,754,190
[45] Aug. 21, 1973

[54] SATURABLE FILTER

[75] Inventor: Lloyd G. Cross, Ann Arbor, Mich.

[73] Assignee: Lear Siegler, Inc., Grand Rapids, Mich.

[22] Filed: Mar. 2, 1964

[21] Appl. No.: 348,532

[52] U.S. Cl. .............. 330/4.3, 350/160 P, 331/94.5
[51] Int. Cl. ............................................. H01s 3/00
[58] Field of Search ...................... 330/4.3; 331/94.5

[56] References Cited
UNITED STATES PATENTS

| | | | |
|---|---|---|---|
| 3,270,291 | 8/1966 | Kosonocky | 331/94.5 |
| 2,722,519 | 11/1955 | Otley | 350/160 P |
| 3,242,440 | 3/1966 | Koester et al. | 330/4.3 |
| 3,281,713 | 10/1966 | Soules | 330/4.3 |
| 3,289,099 | 11/1966 | Masters | 331/94.5 |
| 3,317,848 | 5/1967 | Keyes | 330/4.3 |
| 3,365,678 | 1/1968 | Maurer | 330/4.3 |

OTHER PUBLICATIONS

Cross et al., "Proc. IEEE", Oct. 1966, pp. 1460-1461.
Cross et al., "Journal of Applied Physics", April 1967, p. 2290.
Keyes, "IBM Journal of Research and Development," Oct. 1963, pp. 334–336.

Primary Examiner—Roy Lake
Attorney—Price, Heneveld, Huizenga & Cooper and Wilfred O. Schmidt

[57] ABSTRACT

A multi stage amplifier achieves interstage isolation by utilizing a saturable filter. The filter provides the isolation through its own inherent structure and does not require any external electrical or mechanical signal.

4 Claims, 4 Drawing Figures

PATENTED AUG 21 1973          3,754,190

INVENTOR.
LLOYD G. CROSS
BY
ATTORNEYS

SATURABLE FILTER

This invention relates to saturable filters. More particularly, this invention relates to saturable filters in combination with a multistage energy amplifier and in combination with energy oscillators. Still more specifically, this invention relates to saturable filters in combination with a multistage laser amplifier and in combination with laser oscillators.

Although multistage optical amplifiers are known and understood, there are presently very few such structures in existence. In order for amplification to take place, it is well-known that interstage isolation must be obtained. Some structures utilize mechanical shutters between successive stages, the mechanical shutters normally preventing light from passing from stage to stage, the mechanical shutters opened only during the time amplification is required. Further, attempts have been made to use electro-optical devices which normally prevent the flow of light between stages, the devices opened only during the time of amplification by an external electrical signal provided by a high voltage pulse generator. Additionally, attempts have been made to provide optical separation at each stage of the amplifier to prevent spontaneous amplification. However, all such arrangements exhibit inherent disadvantages. A mechanically operated shutter is slow and must be operated by an external mechanical device which, due to inevitable inertia, must be signalled considerably ahead of the time interval during which amplification is desired. The electro-optical devices also require an external signal of high voltage to operate the shutter mechanism. Although the disadvantages of slow speed are eliminated, such structures are disadvantageous in that they are not able to withstand high power densities without suffering structural damage. Optical separation of the amplifiers means that large physical distances must be provided between amplification, having obvious disadvantages.

It is an object of this invention to provide a multistage energy amplifier which achieves interstage isolation without requiring any external electrical or mechanical signal, thus greatly simplifying the operation of the device and reducing the amount of associated circuitry and related structure required to operate it.

A further object of this invention is to provide such an amplifier utilizing a saturable filter which achieves interstage isolation through its own inherent structure.

A still further object of this invention is to provide such an amplifier utilizing a saturable filter mechanism which achieves interstage isolation through its own atomic structure, there being no components to deteriorate or wear out.

An additional aspect of this invention is the provision of an improved energy oscillator utilizing the saturable filter disclosed herein. As is already well-known, stimulated emission requires two necessary but independently insufficient criteria. These requirements are population inversion and mode selection. Population inversion may be defined as more atoms in a higher excited state than in a lower one. For example, in the burst type laser operation, the laser material is fabricated such that the ends are reflectors for a closed optical path, and the material is excited by an optical pumping source. In other words, some rays of light stimulated by the pumping source travel within the material and return to their point of origin, stimulating additional photons. In the burst type operation, many segments of the material will exhibit stimulated emission, be repumped and oscillate again. It is further known that a reflector may be "switched" providing a Q-switching mode of operation. In this case, a closed optical path does not exist until a reflector is moved into position either mechanically or electro-optically. The reflector is switched out very shortly after being switched in. The result of this mode of operation is a single spike of extremely high peak power. As stated, Q-switching may be accomplished by using a rotating reflector spinning at an extremely high speed. Another method is to rotate the plane of polarization of the light. Although many advantages are gained from the Q-switching mode of operation, inherent limitations are present because of the complexity of the structures involved. Both mechanical and electro-optical shutters are complex and expensive, requiring great care in operation and maintenance.

It is therefore another object of this invention to provide an improved energy oscillator having Q-switching capabilities without the requirement of mechanical or electro-optical switching devices.

A further object of this invention is the provision of such an energy oscillator which utilizes a saturable filter, greatly simplifying the operation of the device and reducing the amount of associated structure and circuitry required to operate the device.

A still further object of the invention is the provision of such an energy oscillator which utilizes a saturable filter which is atomic in nature, thus not subjected to deterioration and wear as are present mechanical and electrical structures.

These and other objects of this invention will become apparent to those skilled in the relevant arts upon reading the following specification, in conjunction with the accompanying drawings, wherein.

Figure 1:
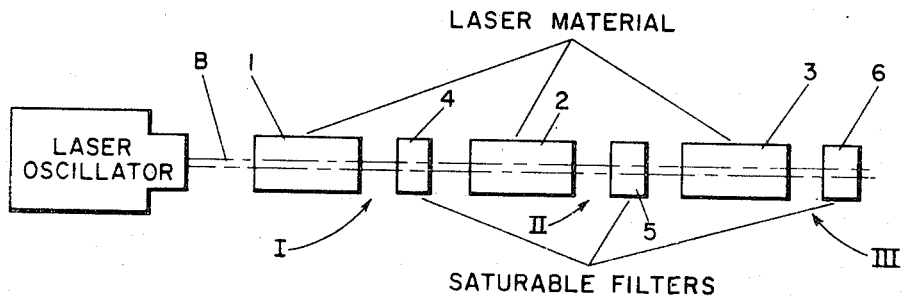
FIG. 1 is a block diagram showing the structure of an embodiment of the improved multistage energy amplifier comprising one aspect of this invention.

Briefly, one aspect of this invention relates to a multistage energy amplifier comprising maser material divided into sections spaced from one another for successive stages of amplification, an oscillator directing a beam of coherent waves of electromagnetic energy at the input section of the maser material, a saturable filter positioned between each of the successive sections of the maser material, the saturable filter characterized by being normally opaque to the beam of coherent waves of electromagnetic energy but becoming transparent thereto upon absorbing a portion of the energy thereof.

Another aspect of this invention relates to the combination of a maser oscillator of the type including maser material and at least partially reflective end members, a saturable filter positioned between one of the reflective end members and the maser material, the saturable filter characterized by having a small energy transmission coefficient under low levels of radiation, the energy transmission coefficient increasing with increasing levels of radiation.

Throughout this application the terms "maser" and "laser" are used. It should be understood that in the use of such terms the following definitions apply. A maser may be defined as an aggregate of instrumentalities primarily adapted for amplifying or generating microwaves and being further of a design primarily adapted for operation below 40° Kelvin, comprising (i) a solid which, at the operating temperature below 40° K., is paramagnetic and which is adapted for association with instrumentalities for creating an inversion in the population of certain energy levels in such solid, the amplifying or generating operation being by reason of the electromagnetic resonant characteristic of such solid; or (ii) means for producing a molecular beam and means for associating such molecular beam with instrumentalities for creating an inversion in the population of certain energy levels in such beam, the amplifying or generating operation being by reason of the molecular resonant characteristics of the molecules within such beam.

The term laser may be defined as a maser disposed to generate or amplify electromagnetic radiation in the optical spectrum; that is waves having a length of between approximately 0.4 and 1.1 microns. It is to be understood, however, that while a laser is shown and described in the preferred embodiments of the invention described herein and shown in the drawings, the principle of the present invention is not restricted to apparatus or methods employing a laser or optical maser but that forms of masers which generate or amplify waves outside of the optical spectrum may be employed without departing from the spirit and scope of the invention.

Filter materials are already in existence which have the capability of absorbing energy up to a certain level, making the filter opaque to the energy up to that level. Beyond the point of absorption, such filters transmit essentially all of the energy therethrough, rendering the filter transparent to the energy. Referring more specifically to the drawing, FIG. 1 shows a schematic diagram of an exemplary multistage energy amplifier made in accordance with the teachings of this invention. In the embodiment shown, the amplification system includes a laser oscillator of the type which, being pumped by an optical pumping source, emits beams of coherent waves of electromagnetic energy. This beam, designated by the letter B, is directed to the first or input stage of the amplification system, designated by the numeral I. In the embodiment shown, three amplification stages are provided, the other stages designated by II and III. Each stage of amplification includes a piece of laser material designated by the reference numerals 1, 2 and 3 respectively, and a saturable filter between each piece of laser material, designated by the reference numerals 4, 5 and 6 respectively. The three stages are identical to one another, stage I being shown schematically in FIG. 2 of the drawing. Except for the saturable filter 4, amplification stage I is conventional in design. The piece of laser material 1 is pumped by an optical pumping source 7 for excitation of the laser material 1, the pumping source 7 operated through a lamp energizing source of conventional structure. The beam B of coherent waves of electromagnetic energy passes through the excited piece of laser material 1, the laser material 1 amplifying the beam B as it passes through and strikes the saturable filter 4. The saturable filter 4 is characterized by being constructed of a material normally opaque to the beam of coherent waves of electromagnetic energy, but becoming transparent thereto upon absorbing a portion of the energy thereof. The best material for such a saturable filter is comprised of atoms which are at one energy level and as input photons strike it, the photons are absorbed and the atoms are excited to a second energy level. When one half of the atoms of the saturable filter are thus excited to the second energy level, transitions between the two energy levels become equalized as additional photons strike the filter, there being thus no net absorption, the filter thus being "saturated" and transparent to the beam. Some energy is lost to the saturable filter — this being the energy required to saturate it. However, in the case of a laser beam, this energy loss is quite small compared to the total energy in the pulse and consequently very high efficiency is obtained. It will be noted that through the use of such a filter, the beam B has been amplified by stage I, yet there has been interstage isolation provided by the saturable filter 4. The beam B passes through identical further stages II and III, thus being further amplified through successive isolated amplification stages.

Figure 2:
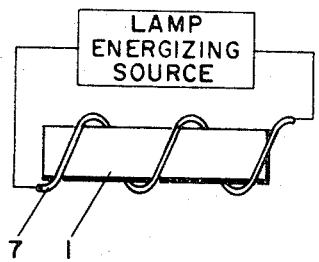
FIG. 2 is a schematic diagram showing one embodiment of one stage of the amplifier shown in FIG. 1.
Figure 3:
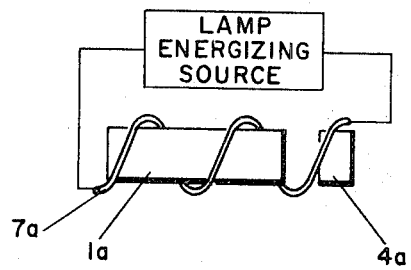
FIG. 3 is a schematic diagram of an alternative embodiment of one section of the amplifier shown in FIG. 1.

In FIG. 3, an alternative construction of each of the amplification stages is shown. In this alternative construction, the saturable filter 4a is moved adjacent to the laser material 1a. The optical pumping source 7a envelops both the saturable filter 4a and the laser material 1a, operated by the lamp energizing source as shown. In this embodiment of the invention, the saturable filter material is characterized by an atomic structure the atoms of which are normally at a first energy level; the atoms being excited by the optical pumping source 7a to a second energy level — the material being opaque to the beam of coherent waves of electromagnetic energy at this second energy level; and the atoms being raised to a third energy level by the beam of coherent waves of electromagnetic energy whereupon the saturable filter becomes transparent thereto upon absorbing a portion of the energy level thereof up to the third energy level. It has been found that an excellent material for fabricating the saturable filter in this embodiment of the invention is a hexavalent uranium doped glass. Such filters may be purchased for example from the Corning Glass Works, such filters identified as Corning Filter No. 3-79 or 3-94. Again, it will be seen that as the beam passes through successive stages of amplification, interstage isolation is provided. The only difference between the structures as disclosed in FIGS. 2 and 3 is that the latter utilizes a material which is excited to an opaque state, becoming transparent to the beam upon being excited to a further energy level as described.

It will now be seen that this invention has provided a multistage energy amplifier which achieves interstage isolation without any electrical or mechanical shutter apparatus of any kind. The structure and operation of the device is greatly simplified due to the reduced amount of associated circuitry and complex apparatus associated with conventional shutters. Further, the saturable filters are atomic in nature and consequently there are no mechanical or electrical components to deteriorate or wear out in operation. The interstage isolation permits greater power handling capabilities and removes the limitations heretofore imposed on mechanical or electrical shutters.

Figure 4:
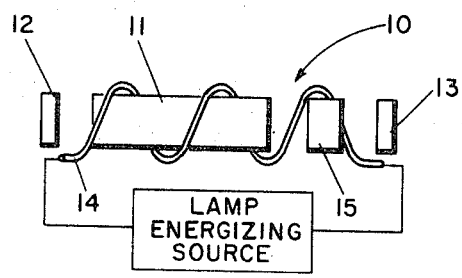
FIG. 4 is a schematic diagram of an improved energy oscillator comprising another aspect of this invention utilizing the teachings thereof.

In FIG. 4, an improved oscillator is shown in schematic form, embodying the principles of the saturable filter as described hereinbefore. In the embodiment shown, the oscillator 10 includes a piece of laser material 11, such as a ruby rod, a pair of parallel reflective end members 12 and 13 and an optical pumping source 14 operably connected to a lamp energizing source as shown for exciting the laser material — all of this structure being already well-known and understood. A saturable filter 15 is mounted in the system, positioned between the laser material 11 and one of the reflective end members 13. In an ordinary laser oscillator, the laser material is stimulated by the optical pumping source, exciting atoms therein to a higher state of energy. When these atoms fall back to a lower state of energy, photons are emitted which stimulate the emission of other photons. In the laser, as it is pumped, the photons traveling between the reflective end members stimulate additional emissions. A wave of electromagnetic energy is built up parallel to the axis of the laser material and when sufficiently built up, it bursts from the end thereof in a beam of coherent waves of electromagnetic energy. As stated hereinbefore, various Q-switching devices have been provided which withhold one of the reflective end members from the optical path, thus allowing the laser material to be pumped to an extremely excited state before the reflector is "switched" in, closing the optical path and allowing a burst of light to be emitted, this burst being of short duration but of high peak power. As further stated, this has been accomplished in the past through the use of complex spinning reflectors or electro-optical devices. By placing the saturable filter 15 as shown in the oscillator 10, the laser material 11 is of necessity pumped to a much higher excited state while overcoming the effect of the filter. The beam of coherent waves of electromagnetic energy perpendicular to the reflective end member 12 cannot pass through the saturable filter 15 until reaching a certain energy level. As described hereinbefore, the inherent characteristic of the saturable filter is that it is opaque to the beam of electromagnetic energy until its atomic structure is such that enough energy has been absorbed to make it transparent to the beam. When the saturable filter becomes thus transparent, the reflective end members 12 and 13 operate to eject a beam of coherent waves of electromagnetic energy from the oscillator of shorter duration and higher power. The effect achieved is that of Q-switching. The saturable filter is thus characterized by having a small energy transmission coefficient under lower levels of radiation, the energy transmission coefficient increasing with increasing levels of radiation.

It will thus be seen that the oscillator disclosed embodying the teachings of the saturable filter disclosed herein attains a Q-switching effect without the use of complex mechanical reflectors or electro-optical devices. This simplification of structure simplifies the construction and operation of the device, reducing the amount of associated structure and circuitry normally required for Q-switching. Further, the saturable filter mechanism is atomic in nature, eliminating mechanical or electrical components which normally deteriorate or wear out.

While only certain embodiments of this invention have been shown and described, it may be possible to practice the invention through the utilization of certain other embodiments without departing from the spirit and scope thereof. Such other embodiments are to be included as part of this invention unless the following claims specifically state otherwise.

I claim:
1. The combination including:
    a first source of radiation of one frequency;
    a second source of radiation of a different frequency;
    a saturable filter disposed with respect to said first and second sources so as to receive radiation therefrom, said filter initially exhibiting a high energy transmission coefficient with respect to all levels of radi-ation from said second source and, upon exposure to radiation from said first source, exhibiting a small energy transmission coefficient with respect to low levels of radiation from said second source, said energy transmission coefficient increasing with increasing levels of radiation from said second source without destruction of said filter.

2. The invention as recited in claim 1 wherein said second source of radiation is disposed with respect to said first source so as to receive radiation therefrom and be excited thereby.

3. The invention as set forth in claim 1 wherein said first source is an optical pumping source and said second source is a laser material, having at least partially reflective end members forming a laser cavity therewith, said laser material positioned to receive radiation from said first source, whereby a population inversion will be induced in said laser material.

4. The invention of claim 1 wherein said saturable filter comprises hexavalent uranium doped glass.

* * * * *